United States Patent [19]

Brown et al.

[11] 4,282,751

[45] Aug. 11, 1981

[54] FLUID FLOWMETER

[75] Inventors: James M. Brown, Allen Park; Hermann Kaiser, Utica; Jerry A. Olson, Dearborn, all of Mich.

[73] Assignee: Eaton Corporation, Cleveland, Ohio

[21] Appl. No.: 70,593

[22] Filed: Aug. 29, 1979

[51] Int. Cl.³ .............................................. G01F 5/00
[52] U.S. Cl. .................................... 73/202; 73/861.63
[58] Field of Search .................... 73/202, 203, 861.63, 73/861.64, 861.65

[56] References Cited

U.S. PATENT DOCUMENTS

| 790,888 | 5/1905 | Ferris | 73/861.64 |
|---|---|---|---|
| 2,293,478 | 8/1942 | Stevenson | 73/202 |
| 2,441,042 | 5/1948 | Stoll | 73/861.65 |
| 3,086,395 | 4/1963 | York | |
| 3,307,396 | 3/1967 | Griffo | |
| 3,308,662 | 3/1967 | Maurer | 73/202 |
| 3,559,482 | 2/1971 | Baker et al. | 73/202 |
| 3,769,835 | 11/1973 | Obermaier | 73/202 |
| 3,889,536 | 6/1975 | Sylvester | 73/861.64 |
| 4,136,565 | 1/1979 | Migrin | 73/861.64 |
| 4,173,890 | 11/1979 | Gilmont | 73/202 |

FOREIGN PATENT DOCUMENTS 1711129 6/1965 U.S.S.R. .

Primary Examiner—Herbert Goldstein
Attorney, Agent, or Firm—R. J. McCloskey; G. Lewis

[57] ABSTRACT

A low pressure drop air flowmeter (10) for an automobile engine is disclosed. The meter contains a main air flow passage (24), a relatively small venturi (20) to receive a portion of the air flow, pressure ports (98a and 120) for sensing stagnation and static pressure and a set of swirl vanes (22) disposed adjacent the outlet of the venturi and operative to impart a swirl to the remainder of the air in the main passage, thereby creating a reduced pressure at the venturi outlet for amplifying the pressure difference between the stagnation and static pressure without appreciably increasing the pressure drop across the flowmeter. A tertiary passage (28) provides a path of fluid communication between points upstream and downstream of the swirl vanes. This passage includes a flow restricting throat (29) which is manually calibrated during or after assembly. Air exiting the tertiary passage impinges upon the swirl to modulate the vortex velocities. This arrangement results in a fluid flowmeter having a characteristic pressure drop which is less than that of a conventional device, particularly at high flow rates. Also disclosed is a solenoid valve (48) operative in the auto-referencing mode to selectively sample stagnation pressure in the tertiary passage or alternatively upstream of the venturi inlet and signal pressure in the throat of the venturi and generate an electrical output signal as a function of the diffrence between these two pressure signals.

19 Claims, 6 Drawing Figures

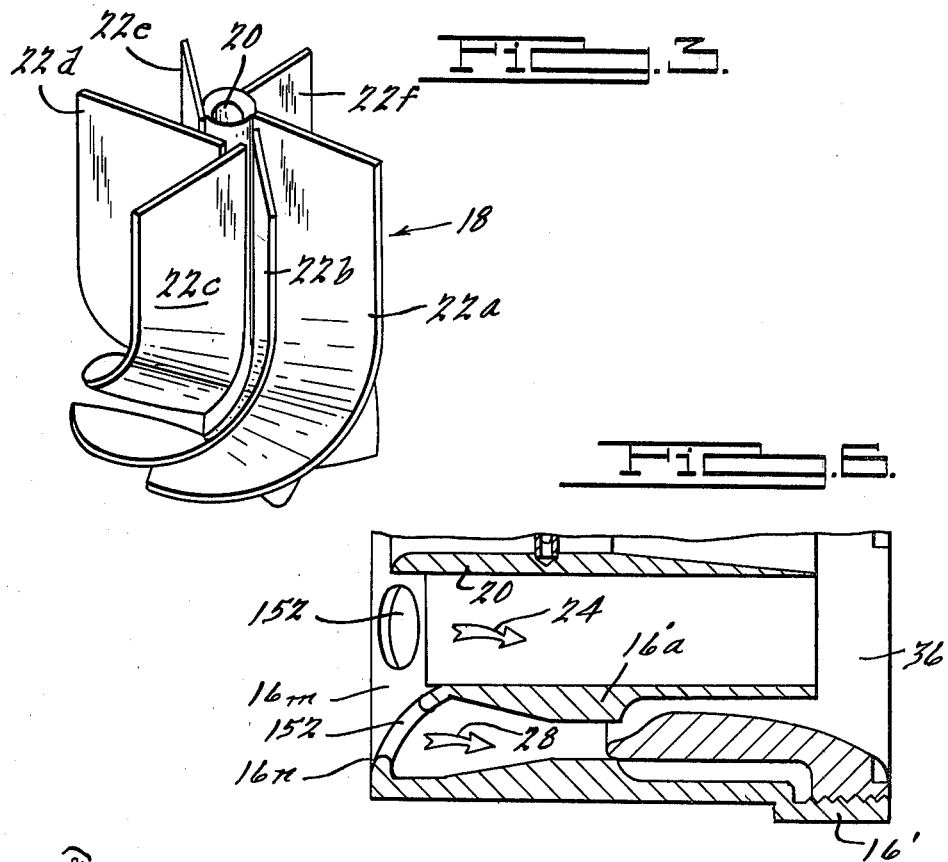
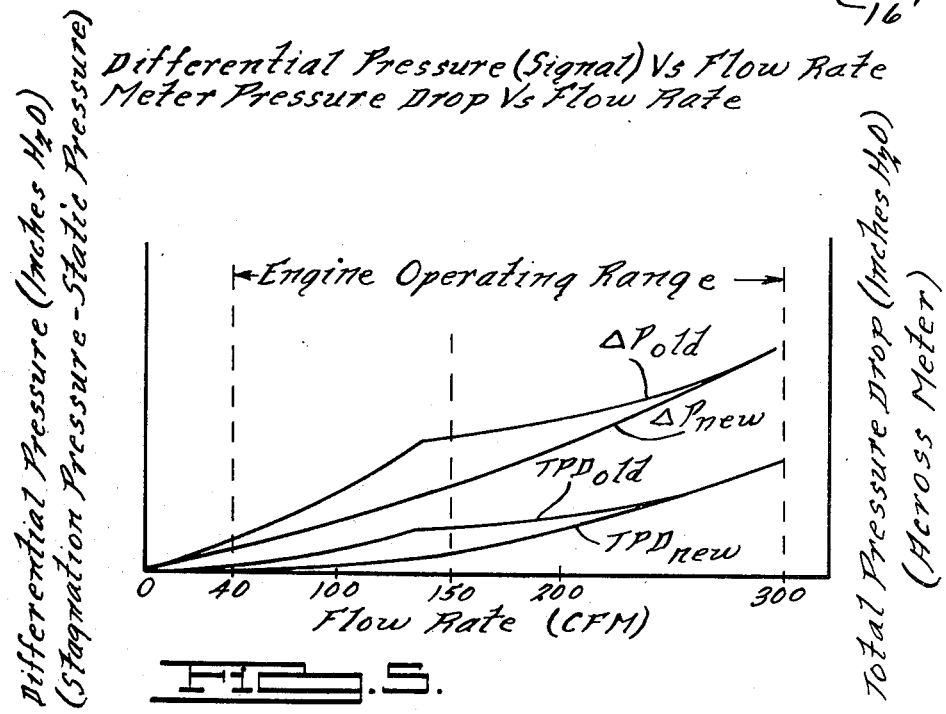

FLUID FLOWMETER

INTRODUCTION

This invention relates to fluid flowmeters in general and particularly to such flowmeters designed specifically for use in automotive internal combustion engines.

CROSS REFERENCE

The invention described in the present application represents an improvement of that described in U.S. Ser. No. 966,844 filed Dec. 6, 1978, now U.S. Pat. No. 4,232,549, issued Nov. 11, 1980 and is related to the inventions described in U.S. Ser. No. 845,751 filed Oct. 26, 1977, now U.S. Pat. No. 4,164,144, issued Aug. 14, 1979 and U.S. Ser. No. 898,267 filed Apr. 20, 1978, now U.S. Pat. No. 4,136,565, issued Jan. 30, 1979.

BACKGROUND OF THE INVENTION

Fluid flowmeters of the pressure drop or differential pressure type are well known. Orifice plate and venturi flowmeters are probably the most common of the pressure drop type. Orifice plate flowmeters are inexpensive, but they are inherently high energy loss devices since the measured pressure drop across the orifice is non-recoverable, i.e., the drop in pressure is a drop in total pressure. Venturi flowmeters are low energy loss devices relative to orifice plate flowmeters since most of the pressure drop in the venturi throat is recoverable at the venturi outlet, i.e., the drop in pressure is due to an increase in kinetic energy of the fluid. However, when either of these flowmeters are used to measure fluid flow which varies over a wide range, such as airflow to an automotive engine, they either overly restrict total airflow at high engine speeds and loads if they are sized small enough to provide an adequate differential pressure signal at low engine speeds and loads, or they provide an inadequate differential pressure signal at low engine speeds and loads if they are sized larger.

As government mandated fuel economy and exhaust emission standards become more stringent, the need for an inexpensive but accurate fluid flowmeter is much more acute. Simplicity of design is desirable not only from a cost standpoint but also for long term performance predictability. In the environment of a modern automobile engine, prior art designs employing moving parts often prove unreliable over extended periods of time as fatigue, corrosion and contaminates adversely effect operation. Prior art designs which have minimized or eliminated moving parts such as ion drift, hot wire anemometer and vibrating reed types, typically are not commercially feasible in automotive applications. In addition, such devices are designed for use with an engine of a predetermined displacement and fine tuning the flowmeter for use with a specific engine or recalibrating the flowmeter for use with an engine having a different displacement and flow characteristic is often impractical.

BREIF DESCRIPTION OF THE INVENTION

The present invention overcomes the above described shortcomings by providing a calibrated fluid flowmeter which sufficiently restricts airflow at relatively low flow rates to generate a useable pressure differential signal and reduces that restriction at higher flow rates to minimize overall pressure drop. This is accomplished by an improved flowmeter of the type including a passageway for the flow of fluid therethrough and a fluid flow sensing means disposed within the passageway operative to generate a signal as a function of the fluid flow, the improvement being a tertiary or bypass passage which operates to interconnect a point within the passageway which is upstream of the flow sensing element with a second point within the passageway which is downstream of the flow sensing element and which defines a restriction which establishes a characteristic discharge coefficient that continuously increases with increasing fluid flow over an entire range of operation. This arrangement affords the progressive diversion of some of the fluid which would otherwise flow through the passageway, thus reducing the overall pressure drop created thereby at predetermined flow rates. This arrangement also eliminates all moving parts in the flowmeter along with the losses that are inherent therewith.

In the preferred embodiment of the present invention, the restriction in the bypass passage is defined by opposed inner and outer protrusions which coact to define a throat, the protrusions being structurally reconfigurable with respect to one another. This arrangement has the advantage of permitting calibration and recalibration of the flow meter after its manufacture to negate the effect of out of tolerance components or processes. This arrangement also provides a flowmeter which can be applied to a multitude of internal combustion engines of varying displacement without requiring entailing major modification of the flowmeter between applications.

According to another aspect of the invention, the bypass passage is arranged to discharge fluid flowing therethrough back into the main flow path at a point axially adjacent the downstream end of a combined swirl vane-secondary passage disposed within the passageway. This has the advantage of enhancing the velocity profile of fluid in a swirl created by the swirl vanes, particularly around the outer periphery thereof.

According to still another aspect of the invention, the bypass passage is characterized by a converging inlet, a diverging outlet and a throttling ring which is threadably engaged with the fluid flowmeter within the bypass passage to effect axial displacement of one of the protruding portions with respect to the other and thus calibration of the device. Additionally, a radial offset is included in the bypass passage to further enhance the choking or throttling effect thereof. This arrangement has the advantage of providing a fluid flowmeter which is devoid of moving parts but still provides efficient throttling of fluid flow through the bypass passage at relatively low flow rates and relative efficiency in passing increasing amounts of fluid through the bypass passage at increasing flow rates.

These and other features and advantages of this invention will become apparent upon reading the following specification, which, along with the patent drawings, describes and discloses a preferred illustrative embodiment of the invention in detail.

The detailed description of the specific embodiments makes reference to the accompanying drawings.

BRIEF DESCRIPTION OF THE DRAWINGS

FIG. 3 is a perspective view on a reduced scale of the swirl vane-venturi assembly employed within the flowmeter of FIG. 1;

FIG. 5 is a pressure differential signal response graph comparing the differential pressure and total meter pressure drop versus that in a unit disclosed in U.S. Ser. No. 966,844, over a typical range of operation;

FIG. 6 is a cross sectional view of an alternative embodiment of the fluid flowmeter.

DETAILED DESCRIPTION OF THE SPECIFIC EMBODIMENTS

Figure 1:
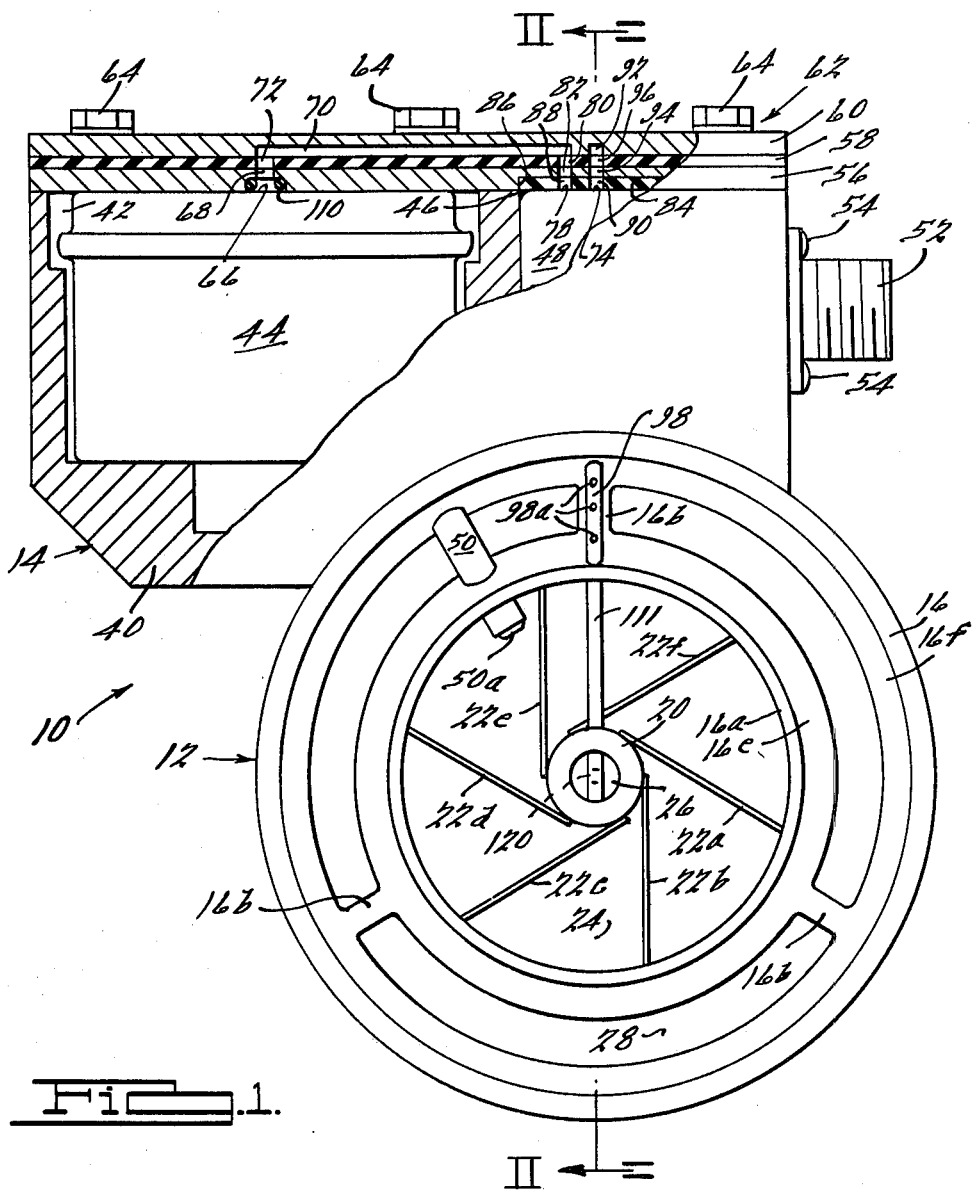
FIG. 1 is a top plan view of the preferred embodiment of the fluid flowmeter with a portion of its valve section broken away to illustrate the internal details thereof.
Figure 2:
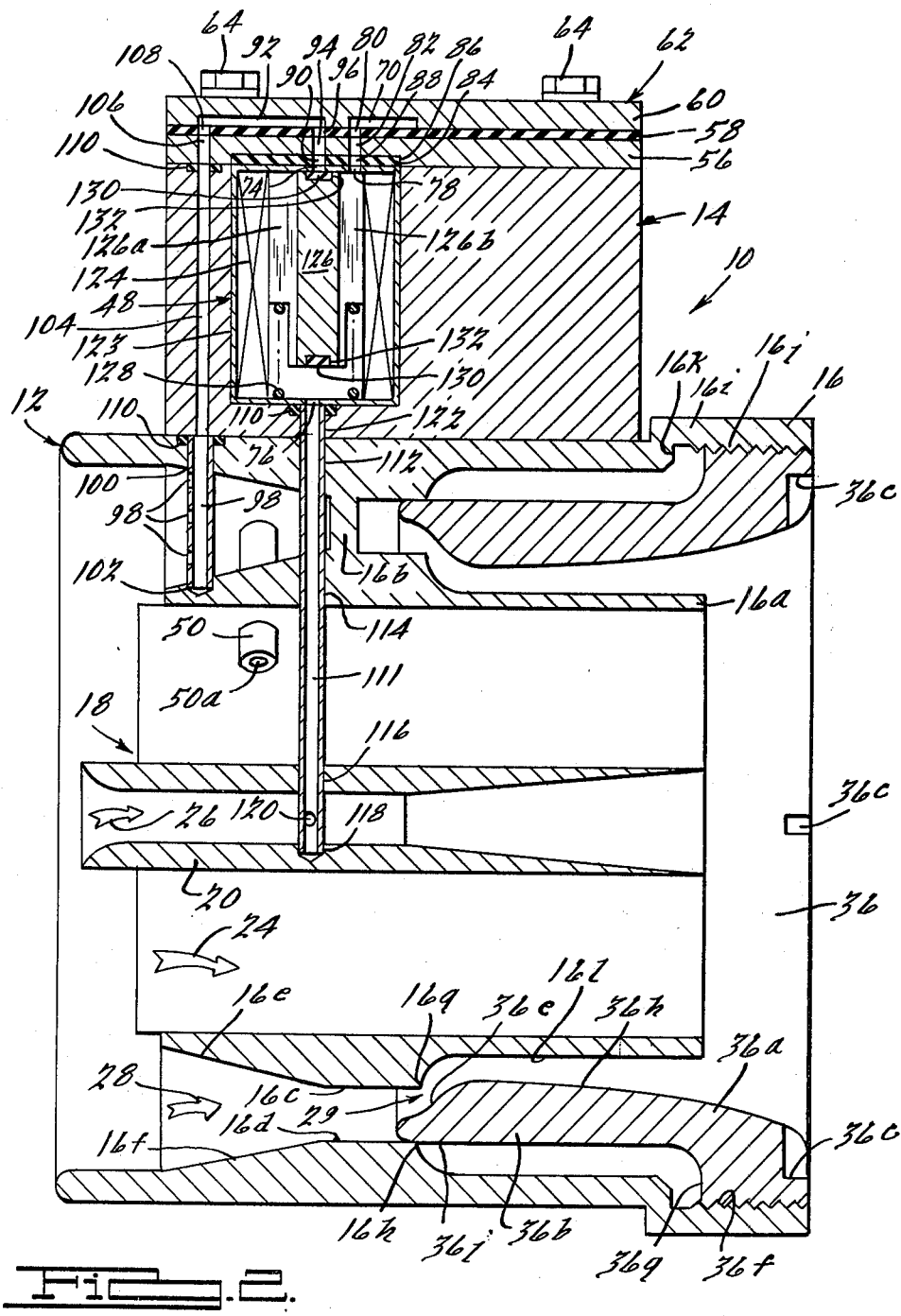
FIG. 2 is a cross sectional view taken on line II—II of FIG. 1.

The preferred embodiment of the invention is illustrated in FIGS. 1 and 2. Flowmeter assembly 10 comprises a flowmeter section 12 and a valve section 14. Flowmeter assembly 10, as disclosed, is adapted for measuring the mass air flow to an internal combustion engine. However, flowmeter section 12, with or without valve section 14, may be used in other environments as a mass flowmeter or a volumetric flowmeter. With the exceptions that will be denoted herein, the present invention operates substantially as is described in U.S. Ser. No. 966,844, filed Dec. 6, 1978 now U.S. Pat. No. 4,232,549 and represents an improvement thereof. Accordingly, U.S. Pat. No. 4,232,549, 4,136,565 and 4,164,144 are incorporated herein by reference.

Flowmeter section 12 comprises a tubular outer housing 16 which is open at both ends for inclusion in the air intake ducting system of an automobile internal combustion engine. As illustrated, air flowing through flowmeter assembly 10 will pass from left to right in FIG. 2. Valve section 14 is mounted on the outwardmost circumferential wall of outer housing 16. Within outer housing 16 is a concentrically disposed inner housing 16a which has a smaller radius than outer housing 16 and depends therefrom by three circumferentially spaced bridges 16b. Outer housing 16, inner housing 16a and bridges 16b are preferably integrally formed of zinc, plastic or the like. However, it is contemplated that they could be formed discretely and subsequently assembled.

Inner housing 16a, like outer housing 16 is open at both ends to allow the flow of air therethrough. A swirl vane/venturi assembly 18 is disposed within inner housing 16a and comprises a venturi 20 which is disposed coaxially with housings 16 and 16a and six swirl vanes 22 (having subscripts a through f inclusive) which are circumferentially spaced within inner housing 16a, extending substantially radially (tangentially) outwardly from the outermost surface of venturi 20 to the innermost surface of inner housing 16a. Swirl vanes 22 are connected at their radially inward and outwardmost ends to the outermost surface of venturi 20 and the innermost surface of inner housing 16a such as by welding, thereby forming a single rigid structure. It is contemplated that venturi 20 and/or swirl vanes 22 could be integrally formed with outer housing 16, inner housng 16a and bridges 16b. Swirl vanes/venturi assembly 18 is shown in an end view of FIG. 1 and in perspective in FIG. 3. Because of the relatively complex shape of swirl vanes 22, they are not illustrated in section in FIG. 2, it being contemplated that one skilled in the art would appreciate their disposition within inner housing 16a based upon FIGS. 2 and 3.

When flowmeter section 12 is interconnected in a system flow path, it presents three parallel concentric passages through which the fluid or air flowing therein may pass. The first of these passages is the main passage defined by the volume radially intermediate the outermost surface of venturi 20 and the innermost surface of inner housing 16a and generally designated by arrow 24. Most fluid passing through flowmeter assembly 10 will flow through passageway 24 and will be acted upon by swirl vanes 22. A secondary passage through which air passing through flowmeter assembly 10 may flow is defined by venturi 20 and designated generally by arrow 26. A tertiary or bypass passage is defined by the volume radially intermediate the outsidemost surface of inner housing 16a and the inner surface of outer housing 16 which is generally designated by arrow 28. All air flowing through flowmeter assembly 10 will thus pass through one of the three passages 24, 26 or 28. Tertiary passage 28 is annular with the exception that it is interrupted at three points by bridges 16b. It is a prime consideration in air flowmeters of this type that the total pressure drop across flowmeter assembly 10 be minimized. Thus, the cross sectional area of bridges 16b will be reduced to a minimum to effect this desired characteristic. Venturi 26 may be replaced by a straight wall tube or a substantially straight wall tube. However, the venturi 20 has been found to provide a lower static pressure than straight wall tubes, particularly when the total air flow through the flowmeter is low, and therefor provides a greater differential pressure signal.

Air pressure through passages 26 and 24 are operated upon by swirl vane/venturi assembly 18 and inner housing 16a substantially as described in the above referenced flowmeter U.S. Pat. Nos. 4,136,565 and 4,164,144 with relatively minor exceptions. Swirl vanes 22 extend in the upstream direction substantially the entire length of venturi 20. This provides a preswirl straighting function which was accomplished by separate straighting vanes in the above referenced applications. Swirl vanes 22 transition from an orientation substantially parallel to air flow at a point approximately axially midway along venturi 20 to an orientation substantially normal to the original direction of air flow within passage 24 at a point adjacent the exit of venturi 20. This creates a low pressure region at the outlet of venturi 20 but results in a much lower total pressure drop because of the gradual transition of swirl vanes 22 rather than a substantially flat acutely angled swirl vane as described in the previous applicatiions referenced hereinabove. It is contemplated that any number of structural variations of swirl vanes 22 can be empirically derived therefrom given a set of system perameters. The arrangement of swirl vanes 22 described herein are therefor intended as being illustrative only.

Although the preferred embodiment of the invention is described as having a main passage 24, a secondary passage 26 and a bypass or tertiary passage 28, it is understood that, in the broadest sense, the invention contemplates the application of a bypass passage with a flowmeter having a single passageway such as that described in U.S. Pat. No. 3,307,396 to Graffo.

Approximately midway axially along inner housing 16a is an area of increased wall thickness 16c projecting into tertiary passage 28. A second area of increased wall thickness 16d is formed in outer housing 16 and also projcts into tertiary passage 28. Upstream of areas of increased wall thickness 16c and 16d are transitional areas 16e and 16f respectively which define an inlet to tertiary passage 28. The inlet defined by transition areas 16a and 16f is gradual to enhance the air flow therethrough and to reduce any pressure drop caused thereby. The downstream ends of areas of increased wall thickness 16c and 16d define a second set of transition areas 16g and 16h respectively. Transition area 16g provides a radially outwardly facing knife edge projection which runs circumferentially around the entire extend of bypass passage 28. Transition area 16g blends into the downstream radially outwardmost surface 161 of housing 16 which is substantially parallel to the axis of symmetry of housng 16 and 16a. Another transition area 16h interconnects area of increased wall thickness 16d and the radially inside downstream wall surface of outer housing 16. The downstreammost end of outer housing 16 has an area of increased diameter 16i which defines an internal thread 16j. The point of transition of area of increasing diameter 16i and the downstream portion of outer housing 16 defines an abutment surface 16k.

A throttling ring 36 constructed of cast metal, plastic or other suitable material is disposed within the downstream end of bypass passage 28 and comprises a base portion 36a of increased thickness characterized by an external thread 36f which engages threads 16i of housing 16. An extendsion portion 36b of throttling ring 36 depends from base portion 36a and projects upstream therefrom. The radially outermost surface 36i slidingly engages area of increased wall thickness 16d forming a seal therebetween. Keyways 36c are provided at the downstreammost end of throttling ring 36 to accomodate a spanner wrench or the like. As throttling ring 36 is threadably engaged into bypass passage 28, peripheral surface 36a slides along area of increased wall thickness 16d. Air flowing through bypass passage 28 thus passes radially inwardly of the upstreammost end of throttling ring 36 between an empirically derived throat surface 36e and transition 16g. Throttling ring 36 is aerodynamically designed for efficient airflow. Throat surface 36e and transition are a 16g define a throat, designated generally at 29 which can be opened or closed by threadably disengaging or engaging throttling ring 36 within housing 16. The upstreammost surface of the base portion 36a or throttling ring 36 defines an abutment surface 36 which abuts surface 16k of housing 16 to define the upstreammost limit of travel of throttling ring 36. Finally, an empirically derived, aerodynamically formed transition area 36h, along with surface 161 of housing 16, defines a diverging outlet from throat 29 within bypass passage 28. For purposes of the claims, the area of inner housing 16a near transition area 16g comprises an inner protrusion into bypass passage 28. The area of outer housing 16 near transition area 16h as well as to area of throttling ring 36 near throat surface 36e comprised an outer protrusion into bypass passage 28.

Prior to operation of flowmeter assembly 10, it must be calibrated (preselected) by threading throttling ring 36 in or out to configure throat 29 to the desired flow characteristic. Typically, this would be achieved by selecting a maximum pressured drop allowed for a specification for a particular application, threading throttling ring 36 to its limit of travel wherein the knife edge formed at the transition between area of increased thickness 16c and transition 16g abuts throat surface 36e. By Backing off (structurally reconfiguring) the throttling ring 36, throat 29 becomes larger and larger as the inner and outer protrusions are axially displaced with respect to one another thereby permitting a larger percentage of air flow to pass through bypass passage 28 through a given range of operation. Although this procedure attenuates the differential pressure signal somewhat, experience has found that that attenuation is minimal and the result is a device which is substantially more efficient and presents a lower total pressure drop then those found in the prior art. Once the desired calibration has been achieved and flow meter assembly 10 placed in operation, it presents three passageways (24, 26, 28) to the fluid flowing therethrough. As would be obvious to one of ordinary skill in the art in light of the present specification and as testing has found out, bypass passage 28 will have a relatively low discharge coefficient at low flow rates whereby a localized back pressure is formed within passage 28 thereby forcing a relatively large percentage of the total air flowing through flow meter assembly 10 to pass either through the main passage 24 or secondary passage 26. Thus, with most of the air flowing through passages 24 and 26, a relatively high gain will be achieved in the pressure differential signal. As air flow increased however the characteristic discharge coefficient of bypass passage 28 will also increase and in effect bypass passage 28 will become more efficient and the pressure differential created by the action of the swirl vane 22 and venturi 20 will encourage bypass 28 to asperate through its throat 29 and thereby draw a larger proportion of the total air flow through bypass passage 29. Air exiting through bypass passage 28 will be at a relatively high velocity and proximate the circumferential wall of the conduit (not illustrated) associated with the downstream end of flowmeter assembly 10. This will tend to increase the velocity of the air flowing near the conduit surface and thus increase overall efficiency of the device. As flow rate continues to increase, asperation through bypass passage 28 tends to draw even a higher percentage of the air therethrough, thereby keeping the total pressure drop across the flowmeter assembly 10 at a lower level than was previously achievable. Although a lower pressure differential signal is generated at high flow rates, this is of relatively little concern, the emphasis in these types of devices being the lowering of pressure drop at high flow rates.

Although a perusal of FIG. 2 by one skilled in the art is adequate to impart an understanding of the operation of bypass passage 28, calibration (reconfiguration) of throat 29 and the discharge coefficient characteristics resulting from such an arrangement, there are several points that shall be made. First, a radial offset portion is included in throat 29 in which the downstream air is deflected radially inwardly for additional choking action. The area of the outlet of bypass passage 28 is substantially smaller than its inlet, resulting in a relatively high velocity imparted to the air as it exits adjacent (downstream) the circumference of the swirl created by swirl vanes 22. Additionally, the outlet is slightly diverging to insure a smooth blending of the air removing in the main passage 24 and that portion passing through bypass passage 28. Finally, the net effect of the illustrated configuration of bypass passage 28 results in a chracteristic discharge coefficient within passage 28 which continuously increases with increasing fluid flow through the flowmeter over an entire range of operation. It is to be understood however that the illustrated embodiments are for purposes of example and are not to be construed as limiting the present invention.

In the preferred embodiment of the invention, swirl vanes 22 are preferrably constructed from brass or stainless steel shimstock but it is contemplated that any other suitable material can be substituted. Additionally, it is to be understood that swirl vanes 22 as shown in FIG. 3 are for illustration purposes only and that any number of obvious variations therefrom can be made. The specific swirl vane arrangement illustrated was derived empirically during research and development involving a specific engine wherein it was found that 6 blades (swirl vanes 22a through 22f) resulted in an optimal low pressure region at the outlet of venturi 20 when they were transitioned from an infinite pitch at the mouth of venturi 20 to approaching a zero pitch adjacent the exit of venturi 20 through a circumferential transition of approximately 120 degrees.

Figure 4:
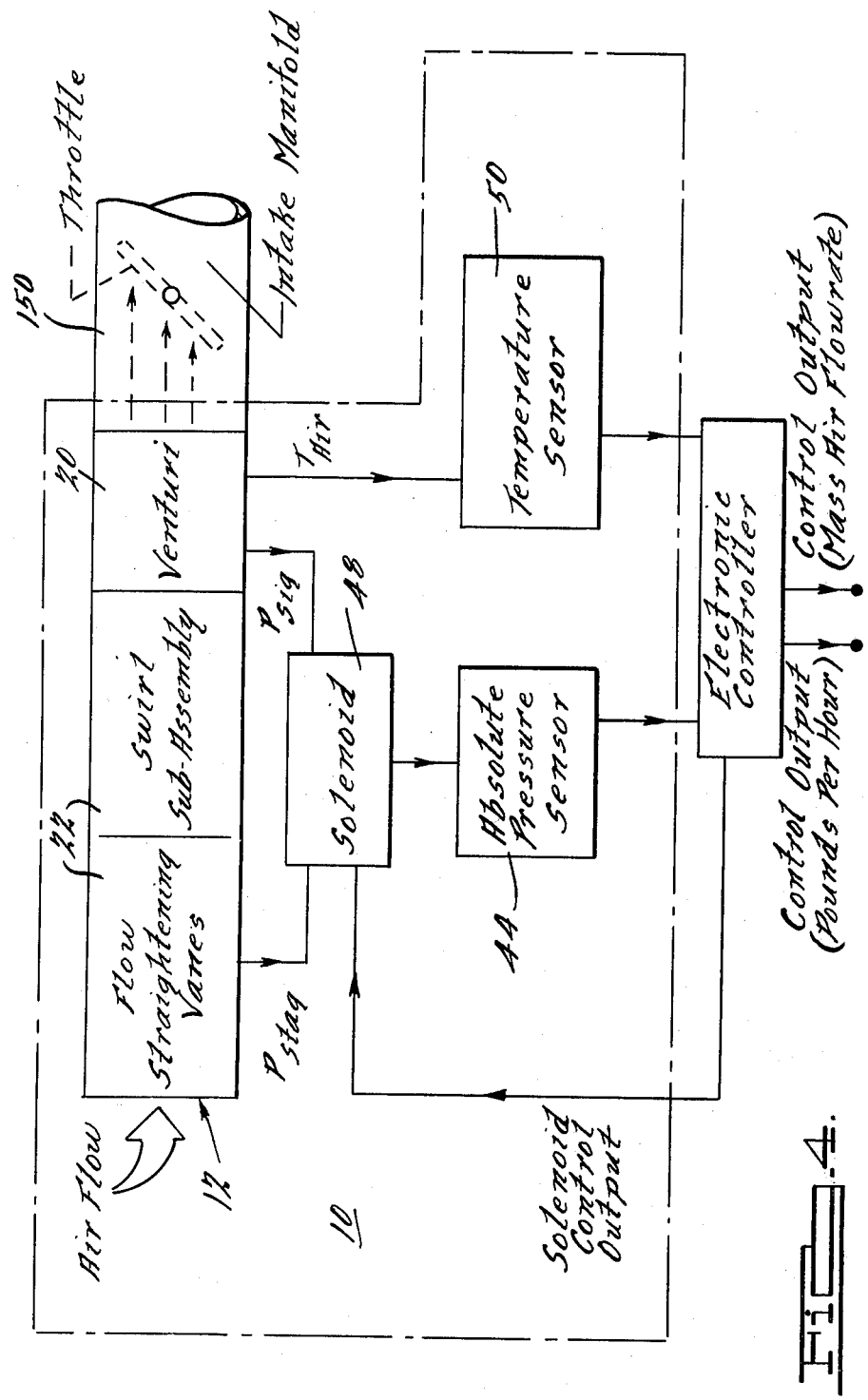
FIG. 4 is a block diagram of the present invention with associated control circuitry.

Valve section 14 comprises an aluminum housing 40 which is mounted to the outside surface of flowmeter section 12 such as by welding or the like. It is also contemplated that housing 40 could be integrally molded with outer housing 16. Housing 40 contains a first cavity 42 which receives a pressure transducer 44 and a second cavity 46 which receives a solenoid 48. Pressure transducer 44 may be of any several well known types. Herein, transducer 44 is an absolute pressure transducer of the type described in Society of Automotive Engineer (SAE) Paper 770397 and manufactured by the Instruments Division of Bunker Remo Corporation. Referring to FIG. 4, transducer 44 measures the absolute stagnation and static pressure within flowmeter assembly 10 and produces electrical output signals representative of each pressure. These signals may be processed by an electronic logic or control system to produce a signal representative of the volumetric air flow through the flowmeter or, since the stagnation pressure is compared with absolute pressure, the signals may be processed with an absolute air temperature signal provided by a temperature sensor 50 in main passage 24 to produce a signal representative of mass air flow through flowmeter assembly 10. Referring to FIGS. 1 and 2, temperature sensor 50 passes through apertures in inner housing 16a and outer housing 16. The temperature sensing element 50a of temperature sensor 50 is disposed within main passage 24 to sense the temperature of the air flowing therethrough. Sensor 50 passes through housing 16 and 16a into housing 40 wherein electrical leads (not illustrated) are routed through channels in housing 40 to an electrical connector 52. Electrical connector 52 is affixed to housing 40 by screws 54 and is adapted to electrically interconnect flowmeter assembly 10 with an electronic logic system.

Cavities 42 and 46 are closed by a cover assembly 62 comprising a first cover plate 56, a gasket 58 and a second cover plate 60. Cover assembly 62 is affixed to housing 40 by six bolts 64 which pass through registering apertures and first cover plate 56, gasket 58 and second cover plate 60 and threadably engage housing 40.

Pressure transducer 44 is a single inlet pressure sensing port 66 which registers with an inlet aperture 68 in first cover plate 56. Aperture 68, in turn, communicates with a channel 70 defined by the insidemost surface of second cover plate 60 through an aperture 72 in gasket 58. Solenoid 48, as described in the above described U.S. Pat. Nos. 4,136,565 and 4,164,144, is a three port device including two axially aligned outlet ports 74 and 76 as well as a single inlet port 78 spaced radially from outlet ports 74 and 76. Channel 70 terminates adjacent inlet port 78 and communicates therewith through apertures 80 and 82 in gasket 58 and first cover plate 56 respectively. Additionally, a second gasket 84 overlays the end of solenoid 48 adjacent cover assembly 62 and is disposed within a relief 86 within first cover plate 56. Gasket 84 has two apertures 88 and 90 which register with ports 78 and 74 respectively. Port 74 of solenoid 48 communicates with a second channel 92 through aperture 90 in gasket 84 and overlaying apertures 94 and 96 in first cover plate 56 and gasket 58 respectively.

A stagnation pressure sensing tube 98 is disposed within tertiary passage 28, passing radially outwardly through an aperture 100 in outer housing 16 and partially radially inwardly through a counterbore 102 on the outsidemost wall of inner housing 16a. Stagnation pressure sensing tube 98 is open at its radially outwardmost end, closed at its radially inwardmost end and has three apertures 98a formed therein spaced radially within tertiary passage 28 and facing upstream. The radially outwardmost opening of stagnation pressure sensing tube 98 registers with a radially disposed stagnation pressure passageway 104 formed in housing 40. Stagnation pressure passageway 104 passes through registering apertures 106 and 108 formed in first cover plate 56 and gasket 58 respectively to communicate with channel 92 formed in the inner surface of second cover plate 60. O-rings 110 are provided for sealing at the point of interconnection of stagnation pressure sensing tube 98 and stagnation pressure passageway 104, stagnation pressure passageway 104 and aperture 106, as well as pressure transducer exit port 66 and aperture 68.

A static pressure sensing tube 111 passes radially inwardly through apertures 112 and 114 in outer housing 16 and inner housing 16a respectively, tertiary passage 28, main passage 24, and aperture 116 in one wall of venturi 20, secondary passage 26 and finally partially through the second wall of venturi 20 within a counterbore 118. Static pressure sensing tube 111 is closed at its radially inwardmost end and open at its radially outwardmost end. Additionally, static pressure sensing tube 111 has static pressure sensing ports 120 which open within secondary passage 26 (the throat of venturi 20) normally to the direction of air flow. Static pressure sensing tube 111 passes radially outwardly beyond the outermost surface of outer housing 16, through an aperture 122 in housing 40 and terminates in an abutting, registering relationship with outlet port 76 solenoid 48. An o-ring 110 is provided to seal the radially outwardmost end of static pressure sensing tube 111 with port 76.

Tubes 98 and 111 are preferably formed of copper, brass or the like. However, it is contemplated that other suitable material could be employed. Additionally, it is contemplated that the passageways provided by tubes 98 and 111 could be provided integrally within housings 16 and 16a and swirl vane/venturi assembly 18 as would be obvious to one skilled in the art. Additionally, stagnation pressure sensing tube 98 is disposed at the inlet of tertiary passage 28, but it is contemplated that it may be selectively positioned elsewhere such as the inlet of main passage 24 or further upstream of flowmeter assembly 10.

Solenoid 40 comprises a cylindrical solenoid case 123 which fully encloses an actuating coil 124 and is disposed within cavity 46. Solenoid 124 as well as pressure transducer 44 have electrical conductors (not illustrated) which are routed to electrical connector 52 through housing 40. Within coil 124 is a slideably disposed plunger 126 which is biased into the position illustrated in FIG. 2 by means of a spring 128. Plunger 126 has two axially disposed peripherally opening v-shaped grooves 126a and 126b running the entire length thereof as well as resilient sealing pads 130 disposed within bores 132 which are axially disposed at the opposite ends thereof. In the position illustrated, the uppermost pad 103 abuts port 74 in case 123 thereby closing communication between channel 92 and grooves 126a and 126b within solenoid 48. With plunger 126 in the position illustrated, port 78 is in fluid communication with port 76 through grooves 126a and 126b in plunger 126. When coil 124 is energized, plunger 126 will move downwardly as viewed in FIG. 2, against the biasing effect of spring 128 to a position where pad 130 will abut port 76 in case 123 thereby interrupting communication between tube 111 and grooves 126a and 126b. At the same time, communication will be established between ports 74 and 78 within solenoid 48.

With plunger 126 of solenoid 124 positioned as illustrated in FIG. 2, pressure transducer 44 operates to sense the static pressure of the air flowing within secondary passage 26. Static pressure ports 120 are disposed within the throat of venturi 20 and communicate with pressure transducer 44 through static pressure sensing tube 111, outlet port 76, grooves 126a and 126b of plunger 126, inlet port 78, aperture 88 of gasket 84, aperture 82 of the first cover plate 56, aperture 80 of gasket 58, channel 70, aperture 72 of gasket 58, aperture 68 of first cover plate 56 and finally, inlet port 66 of pressure transducer 44. Outlet port 74 of solenoid 48 is sealed by the uppermost sealing pad 130 as viewed in FIG. 2. Solenoid case 123 cover the entire peripheral surface as well as the ends of solenoid 48 with the exception of outlet ports 74 and 76 and inlet port 78. Solenoid case 123 and plunger 126 are constructed of ferrous material. Spring 128, housing 40, tube 111, first and second cover plates 56 and 60 respectively are constructed of non-magnetic material such as aluminum, copper, brass or other suitable material. As is obvious to one skilled in the art, when coil 124 is energized, an axially aligned magnetic circuit will be formed there around comprising plunger 126 and case 123. The polarity of the energizing source is applied so that the magnetic influence of coil 124 upon plunger 126 tends to move plunger 126 downwardly against the biasing influence of spring 128. Thus, when energized, plunger 128 will move downwardly into a second position in which lowermost sealing pad 130 establishes an abutting relationship with outlet port 76, thereby sealing tube 111 from pressure transducer 44.

With plunger 126 in the second position, i.e., when coil 124 is energized, pressure transducer 44 operates to sense the stagnation pressure within the inlet of tertiary passage 28 by communicating therewith through averaging apertures 98a, stagnation pressure sensing tube 98, stagnation pressure passageway 104, aperture 106 of first cover plate 56, aperture 108 of gasket 58, channel 92, aperture 96 of gasket 58, aperture 94 of first cover plate 56, aperture 90 of gasket 84, outlet port 74, grooves 126a and 126b of plunger 126, inlet port 78, aperture 88 of gasket 84, aperture 82 of first cover plate 56, aperture 80 of gasket 58, channel 70, aperture 72 of gasket 58, aperture 68 of first cover plate 56, and finally, inlet port 66 of pressure transducer 44.

Stagnation pressure sensing apertures 98a are within tertiary passage 28 in the preferred embodiment of the invention because of their tendency to eliminate surface flow effects around stagnation pressure sensing tube 98 at low flow rates. This is due to the fact that relatively little air flows through tertiary passage 28 during low flow rates and thus there is minimal axial velocity in the air passing stagnation pressure sensing tube 98 in that condition. By alternately energizing and deenergizing coil 124 of solenoid 48, the electrical output at connector 52 from pressure transducer 44 will alternately represent the absolute stagnation pressure of the air flowing through flowmeter assembly 10 and the absolute static pressure of the air measured in the throat of venturi 20 depending upon the position of solenoid 48. These two signals can be processed to produce an electrical signal proportioned to the difference between the two pressures. This technique is commonly referred to as "auto-referencing" which is used in obtaining accurate differential measurements. This results in a device which operates substantially identically as disclosed in U.S. Pat. No. 4,164,144 at relatively low flow rates with the exception that the resulting differential pressure signal will be alternated slightly. At relatively high flow rates, once the characteristic discharge coefficient increases as air begins to flow through tertiary passage 28, the total pressure drop across flowmeter assembly 10 will be substantially decreased as compared with a device as disclosed in U.S. Pat. No. 4,164,144. The pressure differential signal from pressure transducer 44 will also be reduced, but an inconsequential amount. For the purposes of the claims, fluid flow sensing means refers to solenoid 48, transducer 44, static pressure sensing tube 111, stagnation pressure sensing tube 98 as well as the several interconnecting passageways. The configuration of the preferred embodiment is for example only and is not to be construed as limiting. It is understood for example, that total flow sensing can be achieved with a single point measurement.

Referring to FIG. 4, a block diagram of flowmeter assembly 10 and its related control circuit is illustrated. In application, the outputs of pressure transducer (sensor) 44 and temperature sensor 50 are connected to an electronic controller which generates output control signals as a function of pounds per hour, mass air flowrate or other perameter. Sensor 44 is being used in the auto-referencing mode to achieve the highest possible accuracy and provide an atmospheric pressure signal for use in the mass flow computation mode carried out by the electronic controller. In its intended application with an automobile engine, flowmeter assembly 10 can be integrated with a throttle body 150 and joined to the intake manifold. It is also contemplated that multiple airflow assembly—throttle body combinations of the same or varying dimensions can be employed for a single engine.

Referring to FIG. 6 an alternative embodiment of a fluid flowmeter assembly such as that described in FIGS. 1, 2 and 3 is illustrated in which air entering the flowmeter assembly passes through either a main passage 24 which is defined by the volume between the outside most surface of venturi 20 and the inside most surface of an inner housing 16a' or, alternatively, through either venturi 20 or the bypass passage 28. The only difference between the alternative embodiment of the invention illustrated in FIG. 6 and that illustrated in FIGS. 1 through 3 is in the inlet configuration to bypass passage 28. The inlet to bypass passage 28 is covered by a spider 16m which integrally interconnects the upstreammost ends of housings 16' and 16a' which defines a number of circumferentially spaced openings 152 through which air must pass to enter bypass passage 28.

The purpose of the alternative embodiment is to enhance low end sensitivity. At low end, as is obvious to one skilled in the art, air impinging upon the closed portions or surfaces 16n of spider 16m tends to follow the contour of the spider and is thereby funneled radially inwardly and passes through passage 24. This will result in a high percentage of air flowing through passage 24 at low flow rates as compared with the preferred embodiment of the invention. As in the case of the preferred embodiment of the invention, with increasing flow rate, the bypass passage 28 will tend to asperate thereby drawing a larger and larger portion of the total air flow through bypass passage 28. The location of the pressure (stagnation and static) sensing elements are not disclosed in FIG. 6. However, it is contemplated that they could be selectively located in the venturi, the main passage or the bypass passage as would be obvious to one skilled in the art in light of the present disclosure and that of the above described related patent applications.

Referring to FIG. 5 a self-explanatory graphical presentation is made of the operating characteristics of the preferred embodiment of the invention over a typical engine operating range, illustrating the differential pressure (signal) versus flow rate and meter pressure drop versus flow rate for both the present invention (new) and the invention described in U.S. Pat. No. 4,232,549.

It is to be understood that the invention has been described to its reference to specific embodiments which provide the features and advantages previously described, and that such specific embodiments are susceptible of modification, as will be apparent to those skilled in the art. Accordingly, the foregoing description is not to be construed in a limiting sense.

What is claimed is:

1. An improved fluid flowmeter of the type including a passageway for the flow of fluid therethrough and a fluid flow sensing means operative to generate a signal as a function of said fluid flow over a range of operation, said improvement comprising:
   a bypass passage disposed substantially concentrically with said passageway and operative to interconnect a point within said passageway upstream of said fluid flow sensing means with a second point within said passageway downstream of said means; and
   flow restricting means composed of nominally radially opposed inner and outer contoured protrusions disposed within said bypass passage and coacting to define a throat therein, and protrustions being preselectably axially displaceable with respect to one another to establish a characteristic discharge coefficient within said bypass passage which continuously increases with increasing fluid flow over the entire range of operation.

2. The fluid flowmeter of claim 1, wherein said bypass passage defines a converging inlet to and diverging outlet from said throat.

3. The fluid flowmeter of claim 1 further comprising means defining a secondary passage disposed within and extending substantially parallel to the direction of flow in said passageway, said secondary passage including an inlet for receiving a portion of the fluid flowing in the passageway and an outlet for discharging said portion into the passageway downstream of said inlet.

4. The fluid flowmeter of claim 3 further comprising means receiving at least a portion of the remaining fluid in said passageway and operative to impart a velocity vector thereto at an angle to said passageway flow for creating a reduced pressure region at the outlet of said secondary passage.

5. The fluid flowmeter of claim 3 wherein said fluid flow sensing means comprises
   means for sensing the stagnation pressure of the fluid at a location upstream of said secondary passage outlet; and
   means for sensing the static pressure of the fluid in the secondary passage.

6. The fluid flowmeter of claim 5 wherein said fluid flow sening means further comprises means operative to sense the difference between said stagnation pressure and said reduced static pressure in said secondary passage.

7. The fluid flowmeter of claim 3 wherein said secondary passage comprises a venturi.

8. A device for measuring the flow of fluid therethrough comprising:
   means defining a main passage;
   means defining a secondary passage disposed within and extending substantially parallel to the direction of flow in said main passage, said secondary passage including an inlet for receiving a portion of the fluid flowing in the main passage and an outlet for discharging said portion into the main passage downstream of said inlet;
   means for sensing the stagnation pressure of the fluid in the main passage upstream of said secondary passage outlet;
   means for sensing the static pressure of the fluid in the secondary passage;
   swirl means receiving at least a portion of the remaining fluid in said main passage and operative to impart a velocity thereto at an angle to said main passage flow for creating a reduced pressure region at the outlet of said secondary passage;
   means operative to sense the difference between said stagnation pressure and said reduced static pressure in said secondary passage; and
   means defining a tertiary passage disposed without and extending substantially parallel to the direction of flow in said main passage, said tertiary passage comprising substantially opposed inner and outer protrusions coacting to define a throat, said protrusions being preselectably axially displaceable with respect to one another, said tertiary passage operating to pass another portion of fluid flowing in said main passage from a point upstream of said swirl means to a point adjacently downstream of said swirl means.

9. The device of claim 8 wherein said main, secondary and tertiary passages are disposed substantially concentrically with respect to one another.

10. The device of claim 9 wherein at least one of said opposed protrusions is defined by a throttling ring mounted for threaded axial advancement within said tertiary passage.

11. The device of claim 8 wherein said tertiary passage comprises a converging inlet and a diverging outlet.

12. The device of claim 8 wherein said tertiary passage includes a radially offset portion.

13. The device of claim 8 wherein said secondary passage comprises a venturi.

14. A device for measuring the flow of fluid therethrough comprising:
  means defining a main passage; means defining a secondary passage disposed within and extending substantially parallel to the direction of flow in said main passage, said secondary passage including an inlet for receiving a portion of the fluid flowing in the main passage and an outlet for discharging said portion into the main passage downstream of said inlet;
  means for sensing the stagnation pressure of the fluid in the main passage upstream of said secondary passage outlet;
  means for sensing the static pressure of the fluid in the secondary passage;
  swirl means receiving at least a portion of the remaining fluid in said main passage and operative to impart a velocity thereto at an angle to said main passage flow for creating a reduced pressure region at the outlet of said secondary passage;
  means operative to sense the difference between said stagnation pressure and said reduced static pressure in said secondary passage; and
  means defining a tertiary passage disposed concentrically externally of said secondary passage and including an inlet for receiving another portion of the fluid flowing in the main passage, a throat, and an outlet for discharging said another portion into said main passage at a point substantially axially adjacent the outlet of said secondary passage but spaced radially therefrom.

15. The device of claim 14 wherein said throat comprises substantially opposed inner and outer protrusions, at least one of said protrusions being axially displaceable with respect to the other.

16. The device of claim 15 wherein at least one of said opposed protruding portions is defined by a throttling ring threadably engaged with said device for axial advancement within said tertiary passage.

17. The device of claim 14 wherein said tertiary passage comprises a converging inlet and a diverging outlet.

18. The device of claim 14 wherein said tertiary passage comprises an axial offset.

19. The device of claim 14 wherein secondary passage comprises a venturi.

* * * * *